United States Patent [19]

Yamamoto et al.

[11] Patent Number: 4,838,024
[45] Date of Patent: Jun. 13, 1989

[54] HYDRAULICALLY OPERATED CONTINUOUSLY VARIABLE TRANSMISSION

[75] Inventors: Noboru Yamamoto; Mitsumasa Furumoto; Eiichiro Kawahara; Kenichi Ikehjiri, all Saitama, Japan

[73] Assignee: Honda Giken Kogyo Kabushiki Kaisha, Tokyo, Japan

[21] Appl. No.: 122,775

[22] Filed: Nov. 19, 1987

[30] Foreign Application Priority Data

Nov. 19, 1986 [JP] Japan ............................ 61-275755
Nov. 19, 1986 [JP] Japan ............................ 61-275756

[51] Int. Cl.$^4$ ............................................ F16D 39/00
[52] U.S. Cl. ........................................ 60/488; 60/487; 184/6.17
[58] Field of Search .................. 184/6.17, 6.12; 60/487–492; 91/499, 505, 506

[56] References Cited

U.S. PATENT DOCUMENTS

| | | |
|---|---|---|
| 2,624,321 | 1/1953 | Levetus . |
| 3,143,858 | 10/1964 | Roeske . |
| 3,445,184 | 7/1969 | Frandsen . |
| 3,449,912 | 6/1969 | Dunikowski . |
| 3,543,514 | 12/1970 | Reimer . |
| 3,555,817 | 1/1971 | Hann . |
| 3,834,164 | 9/1974 | Ritter . |
| 3,907,043 | 9/1975 | Appleman . |
| 3,999,387 | 12/1976 | Knopf . |
| 4,087,969 | 5/1978 | Takahashi et al. ............ 60/488 |
| 4,444,093 | 4/1984 | Koga et al. ................. 91/507 |
| 4,478,134 | 10/1984 | Kawahara et al. ........... 91/488 |
| 4,637,293 | 1/1987 | Yamaguchi . |
| 4,646,520 | 3/1987 | Furumoto . |

FOREIGN PATENT DOCUMENTS

| | | |
|---|---|---|
| 54-134252 | 10/1979 | Japan . |
| 54-134253 | 10/1979 | Japan . |
| 55-14312 | 1/1980 | Japan . |
| 55-152622 | 11/1980 | Japan . |
| 56-52659 | 5/1981 | Japan . |
| 56-143857 | 11/1981 | Japan . |
| 57-70968 | 5/1982 | Japan . |
| 57-76357 | 5/1982 | Japan . |
| 59-38467 | 9/1984 | Japan . |
| 902978 | 8/1962 | United Kingdom . |

*Primary Examiner*—Edward K. Look
*Attorney, Agent, or Firm*—Lyon & Lyon

[57] ABSTRACT

A hydraulic motor and a hydraulic pump are interconnected by a closed hydraulic circuit. A lubricating chamber is defined around the sliding surfaces of the swash plate and the plungers of at least one of the hydraulic pump and the hydraulic motor. A hydraulically hermetic chamber is defined in surrounding relations to at least one of the hydraulic pump and the hydraulic motor. The hydraulically hermetic chamber is connected to a replenishing pump by a relief valve which is openable at a pressure level. A pressure control valve is disposed in a discharge passageway of the hydraulically hermetic chamber and openable at a first pressure level lower than the pressure level for the relief valve. In another embodiment, a second pressure control valve is connected to a junction between the first pressure control valve and the lubricating chamber and openable at a second pressure level lower than the second pressure level.

7 Claims, 11 Drawing Sheets

HYDRAULICALLY OPERATED CONTINUOUSLY VARIABLE TRANSMISSION

BACKGROUND OF THE INVENTION

The present invention relates to a hydraulically operated continuously variable transmission, and more particularly to a hydraulically operated continuously variable transmission having a pressure control valve which is openable at a pressure level selected to allow a relief valve to operate normally or allow oil to circulate smoothly in a hydraulically hermetic chamber.

Hydraulically operated continuously variable transmissions are known in the art as disclosed in Japanese Laid-Open Patent Publication No. 56-143857, for example.

In such hydraulically operated continuously variable transmissions, oil is released from a relief valve which maintains the oil pressure discharged from a replenishing pump and delivered as lubricating oil into a hydraulically hermetic chamber to lubricate mutually sliding surfaces of the transmission. The hydraulically hermetic chamber has an oil discharge port which is relatively small in order to sufficiently seal the lubricating oil within the hydraulically hermetic chamber. Therefore, when the hydraulic pump or motor of the transmission rotates at high speed or under high load to allow oil to leak from between the sliding surfaces, the oil pressure in the hydraulically hermetic chamber builds up and may exceed a pressure level set for opening the relief valve. As a result, the relief valve may not operate normally. When this happens, the oil pressure discharged from the replenishing pump is excessively increased to an undesired level which in turn increases the load on the input shaft of the transmission, resulting in a lowered power transmission efficiency.

As disclosed in Japanese Laid-Open Patent Publication No. 61-118566, it has been known to provide a lubricating chamber surrounding the mutually sliding surfaces of a swash plate and plungers of a swash-plate-type hydraulic motor or pump.

Where the lubricating chamber is incorporated in a hydraulic motor for a hydraulically operated transmission as disclosed in Japanese Laid-Open Patent Publication No. 57-76357, oil released from a pressure control valve which regulates the oil pressure in a hydraulically hermetic chamber surrounding the hydraulic pump may be supplied to the lubricating chamber in the hydraulic motor.

If oil released from the pressure control valve is supplied to the lubricating chamber, when the amount of lubricating oil leaked from between the sliding surfaces of a swash plate and plungers is increased at high speed or under high load, the oil pressure in the lubricating chamber is increased and may exceed a pressure level set for opening the pressure control valve, which in turn may not operate normally. With the pressure control valve not being operated normally, oil is not circulated smoothly in the hydraulically hermetic chamber and the temperature of the oil rises beyond a suitable temperature level, with the consequence that the durability of the hydraulic pump is reduced.

SUMMARY OF THE INVENTION

It is an object of the present invention to provide a hydraulically operated continuously variable transmission having a relief valve which is allowed to operate normally at all times.

Another object of the present invention is to provide a hydraulically operated continuously variable transmission in which oil is smoothly circulated in a hydraulically hermetic chamber surrounding a hydraulic pump.

According to the present invention, there is provided a hydraulically operated continuously variable transmission comprising an input shaft, a hydraulic pump coupled to the input shaft and having a pump swash plate and a pump cylinder supporting an annular array of slidable pump plungers held in slidable contact with the pump swash plate through mutually sliding surfaces, an output shaft, a hydraulic motor coupled to the output shaft and having a motor swash plate and a motor cylinder supporting an annular array of slidable motor plungers held in slidable contact with the motor swash plate through mutually sliding surfaces, a closed hydraulic circuit interconnecting the hydraulic pump and the hydraulic motor, a hydraulically hermetic chamber surrounding at least one of the hydraulic motor and the hydraulic pump, the hydraulically hermetic chamber communcating with the sliding surfaces of the at least one of the hydraulic motor and the hydraulic pump, a replenishing pump operatively coupled to the input shaft and connected to the closed hydraulic circuit through a replenishing oil passage, a relief valve through which the hydraulically hermetic chamber is connected to the replenishing oil passage, the relief valve being openable when the oil pressure in the replenishing oil passage exceeds a first pressure level, and a pressure control valve disposed in a discharge passageway of the hydraulically hermetic chamber and openable when the oil pressure in the hydraulically hermetic chamber exceeds a second pressure level which is lower than the first pressure level.

When the amount of working oil leaked from between the sliding surfaces is increased and the oil pressure in the hydraulically hermetic chamber exceeds the second pressure level, the pressure control valve is opened to discharge the oil from the hydraulically hermetic chamber. Inasmuch as the second pressure level is lower than the first pressure level, the oil pressure in the hydraulically hermetic chamber does not rise beyond the first pressure level for the relief valve, which is thus permitted to operate normally at all times.

According to the present invention, there is also provided a hydraulically operated continuously variable transmission comprising an input shaft, a hydraulic pump coupled to the input shaft and having a pump swash plate and a pump cylinder supporting an annular array of slidable pump plungers held in slidable contact with the pump swash plate through mutually sliding surfaces which are supplied with oil from the pump cylinder for lubrication thereof, an output shaft, a hydraulic motor coupled to the output shaft and having a motor swash plate and a motor cylinder supporting an annular array of slidable motor plungers held in slidable contact with the motor swash plate through mutually sliding surfaces which are supplied with oil from the pump cylinder for lubrication thereof, a closed hydraulic circuit interconnecting the hydraulic pump and the hydraulic motor, a lubricating chamber surrounding the sliding surfaces of the swash plate and the plungers of at least one of the hydraulic pump and the hydraulic motor, a hydraulically hermetic chamber surrounding the other of the hydraulic motor and the hydraulic pump, the hydraulically hermetic chamber communcating with the sliding surfaces of the other of the hydraulic motor and the hydraulic pump, a first pressure control valve connected between the hydraulically hermetic chamber and an oil passage leading to the lubricating chamber and openable when the oil pressure in the hydraulically hermetic chamber exceeds a first pressure level, and a second pressure control valve connected to a junction between the first pressure control valve and the oil passage and openable when the oil pressure in the oil passage exceeds a second pressure level lower than the first pressure level.

When the oil pressure in the lubricating chamber increases beyond the second pressure level, the second pressure control valve is opened to discharge the oil from the lubricating chamber. The oil pressure in the lubricating chamber does not exceed the first pressure level because the second pressure level is lower than the first pressure level Accordingly, the oil in the hydraulically hermetic chamber is allowed to circulate smoothly.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
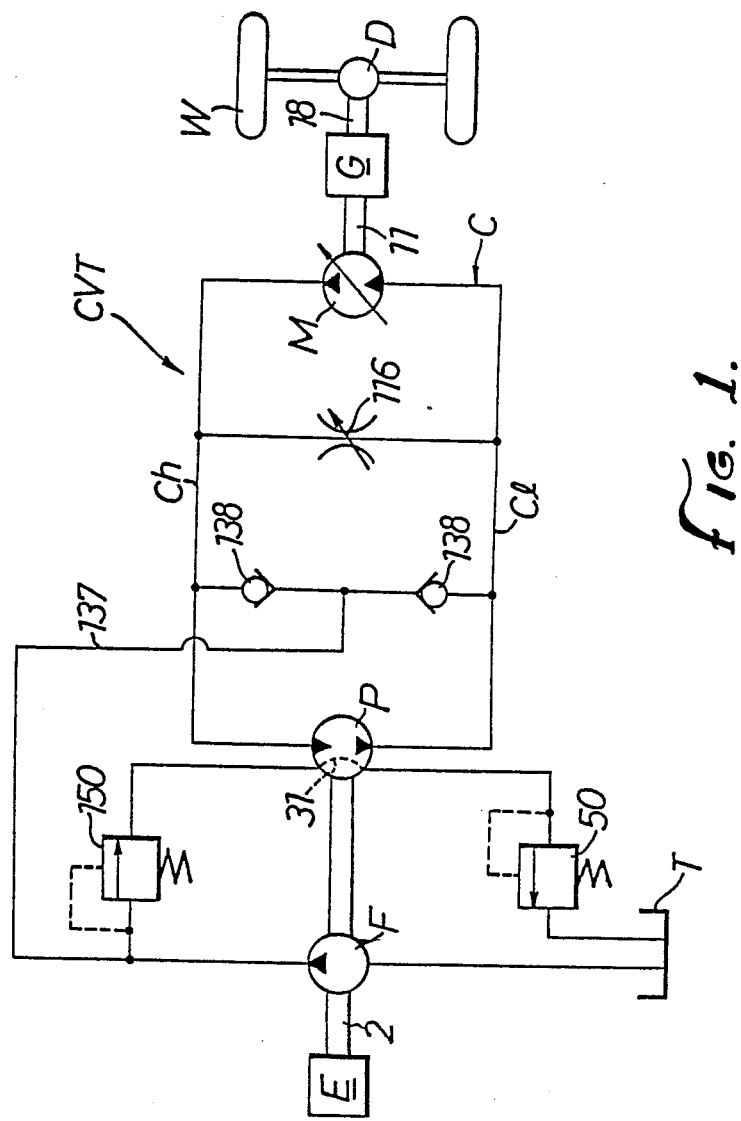
FIG. 1 is a circuit diagram of a hydraulic circuit arrangement of a hydraulically operated continuously variable transmission according to an embodiment of the present invention.

Like or corresponding parts are denoted by like or corresponding reference numerals throughout the several views.

FIG. 1 shows a hydraulically operated continuously variable transmission CVT according to an embodiment of the present invention for use on a motor vehicle such as an automobile, the transmission CVT basically comprising a hydraulic pump P of the fixed displacement type coupled to an input shaft 2 driven by an engine E and a hydraulic motor M of the variable displacement type disposed coaxially with the hydraulic pump P. The hydraulic pump P and the hydraulic motor M are coupled in a closed hydraulic circuit C. The hydraulic motor M is operatively coupled to wheels W through an output shaft 11, a forward/reverse gear assembly G, an auxiliary shaft 18, and a differential D.

The closed hydraulic circuit C includes a higher pressure oil passage Ch interconnecting the outlet port of the hydraulic pump P and the inlet port of the hydraulic motor M and a lower pressure oil passage Cl interconnecting the outlet port of the hydraulic motor M and the inlet port of the hydraulic pump P. The higher and lower pressure oil passages Ch, Cl are interconnected by a clutch valve 116. The input shaft 2 drives a replenishing pump F having an outlet port connected to the higher and lower oil passages Ch, Cl through a replenishing oil passage 137 and a pair of check valves 138. The replenishing pump F, when actuated, supplies working oil from an oil tank T through the replenishing oil passage 137 to the closed hydraulic circuit C to compensate for an oil shortage in the circuit C. A relief valve 150 is connected to the replenishing oil passage 137. When the oil pressure in the replenishing oil passage 137 exceeds a prescribed pressure level, the relief valve 150 is opened to release oil which is introduced into a hydraulically hermetic chamber 31 of the hydraulic pump P. A pressure control valve 50 coupled between the chamber 31 and the oil tank T is opened when the oil pressure in the chamber 31 exceeds a prescribed pressure level. The pressure level set for opening the pressure control valve 50 is lower than the pressure level set for the relief valve 150.

The clutch valve 116 comprises a restriction valve switchable between an open position in which the higher and lower pressure oil passages Ch, Cl are interconnected and a fully closed position in which the higher and lower pressure oil passages Ch, Cl are disconnected from each other, the clutch valve 116 having an intermediate open position When the clutch valve 116 interconnects the higher and lower pressure oil passages Ch, Cl, no oil pressure is supplied to the hydraulic motor M and hence the transmission is in a neutral condition with the hydraulic motor M being inoperative. When the clutch valve 116 disconnects the higher and lower pressure oil passages Ch, Cl from each other, working oil circulates between the hydraulic pump P and the hydraulic motor M to transmit driving power for thereby causing the motor vehicle to run. When the clutch valve 116 is in the intermediate open position, working oil circulates at a rate dependent on the opening of the clutch valve 116, which is thus held in a "partly engaged" condition.

The structure of the continuously variable transmission CVT will be described in detail with reference to FIG. 2. The continuously variable transmission CVT is housed in a transmission case 1 composed of a pair of longitudinally separate case members 1a, 1b.

The hydraulic pump P has a pump cylinder 4 splined at 3 to an input shaft 2, a plurality of cylinder holes or bore 5 defined in the pump cylinder 4 in a circular pattern around the input shaft 2, and a plurality of pump plungers 6 slidably fitted respectively in the cylinder holes 5. The power of the engine E is transmitted through a flywheel 7 to the input shaft 2.

The hydraulic motor M has a motor cylinder 8 disposed concentrically in surrounding relation to the pump cylinder 4 and rotatable relatively thereto, a plurality of cylinder holes or bores 9 defined in the motor cylinder 8 in a circular pattern around the center of rotation thereof, and a plurality of motor plungers 10 slidably fitted respectively in the cylinder holes 9.

The motor cylinder 8 has axially opposite ends on which output and support shafts 11, 12 are coaxially mounted, respectively. The output shaft 11 is rotatably supported on the axial end wall of the case member 1a by means of a needle bearing 13, and the support shaft 12 is rotatably supported on the axial end wall of the case member 1b by means of a ball bearing 14.

The input shaft 2 extends through the end wall of the case member 1a in a fluid-tight manner, and is disposed concentrically in the output shaft 11. A plurality of needle bearings 15 are disposed between the inner surface of the output shaft 11 and the outer surface of the input shaft 2, so that the input shaft 2 and the pump cylinder 4, and the output shaft 11 and the motor cylinder 8 are relatively rotatable.

Parallel to the output shaft 11, the auxiliary shaft 18 is rotatably supported on the opposite end walls of the transmission case 1 by a roller bearing 16 and a ball bearing 17. The forward/reverse gear assembly G is located between the auxiliary shaft 18 and the output shaft 11.

The forward/reverse gear assembly G comprises a pair of driver gears 19, 20 fixedly mounted on the output shaft 11, a driven gear 21 rotatably supported on the auxiliary shaft 18 in mesh with the driver gear 19, a driven gear 22 rotatably supported on the auxiliary shaft 18 in radial alignment with the other driver gear 20, an intermediate gear 23 meshing with the driver gear 20 and the driven gear 22, a driven clutch gear 24 fixed to the auxiliary shaft 18 between driver clutch gears 21a, 22a integral with the opposite surfaces of the driven gears 21, 22, and a clutch member 25 for selectively coupling the driver clutch gears 21a, 22a to the driven clutch gear 24. A shift fork 26 engages in the clutch member 25 for selectively moving the same axially into engagement with the driver clutch gear 21a and the driven clutch gear 24 or the driver clutch gear 22a and the driven clutch gear 24.

The auxiliary shaft 18 has an integral gear 28 held in mesh with an input gear 27 of the differential D. In response to operation of the clutch member 25, the differential D is operated selectively in forward and reverse directions of the motor vehicle.

Figure 3:
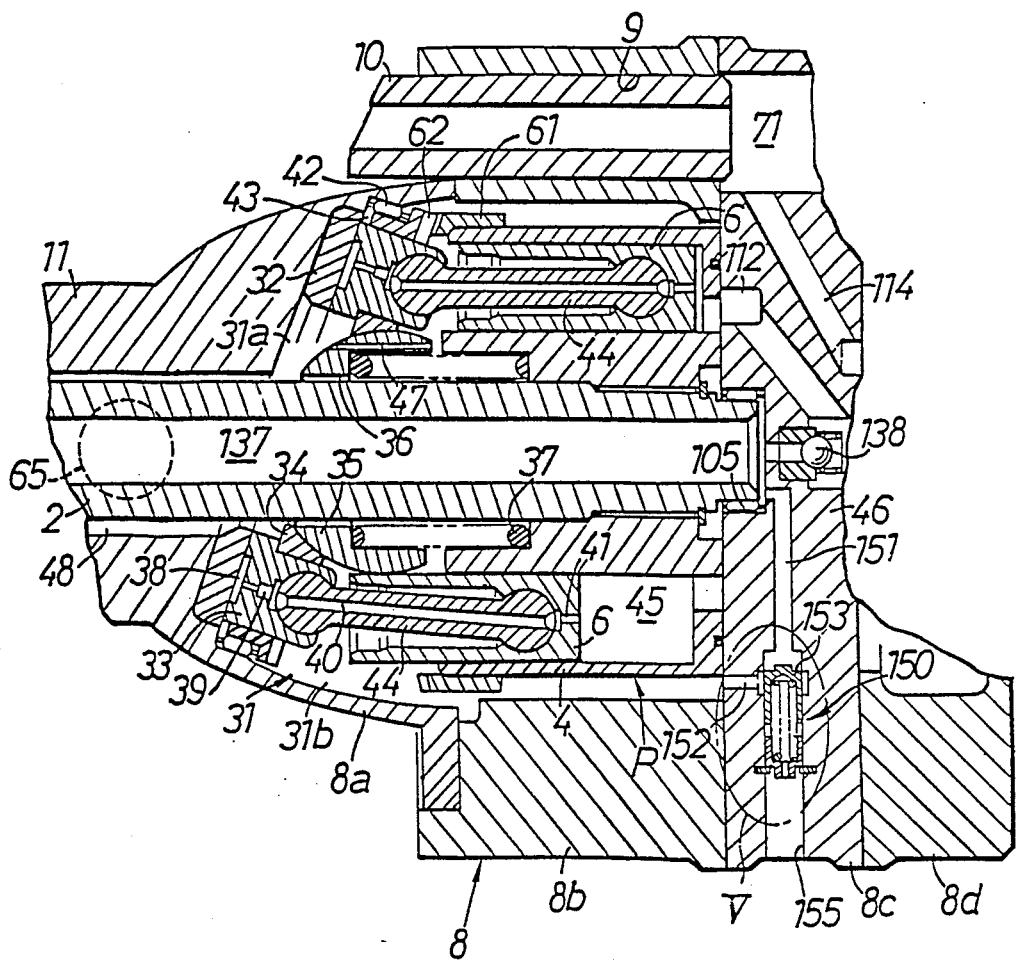
FIG. 3 is an enlarged fragmentary cross-sectional view of a portion of the hydraulically operated continuously variable transmission shown in FIG. 2.

As shown in FIG. 3, the hydraulically hermetic chamber 31 is defined between the motor cylinder 8 and the pump cylinder 4, and a pump swash plate 32 is supported in the chamber 31 inwardly of the motor cylinder 8 in facing relation to the end face of the pump cylinder 4. An annular unitary pump shoe 33 is held in slidable contact with the pump swash plate 32.

The pump plungers 6 and the pump shoe 33 are relatively swingably coupled by connecting rods 44. A presser ring 34 supported on the motor cylinder 8 by a roller bearing 42 is held against an inner peripheral step of the pump shoe 33. A spring holder 35 is held against the presser ring 34, the spring holder 35 being coupled to the input shaft 2 through splines 36 which allow axial movement of the spring holder 35 on the input shaft 2 but prevent rotation of the spring holder 35 relatively to the input shaft 2. A coil spring 37 is disposed around the input shaft 2 between the spring holder 35 and the pump cylinder 4 for normally pressing the spring holder 35 to cause the presser ring 34 to push the pump shoe 33 resiliently toward the pump swash plate 32. The spring holder 35 has a partly spherical surface contacting a complementary partly spherical surface of the presser ring 34. Therefore, the spring holder 35 is neatly held against the presser ring 34 for transmitting the resilient force from the spring 37 to the presser ring 34.

The chamber 31 is divided into a first chamber 31a near the pump swash plate 32 and a second chamber 31b near the pump cylinder 4 by the pump shoe 33, the presser ring 34, and the spring holder 35.

The pump swash plate 32 and the pump shoe 33 have mutually sliding surfaces with their inner peripheral edges facing into the first chamber 31a, so that lubricating oil leaking from these sliding surfaces flow into the first chamber 31a. To lubricate the sliding surfaces of the pump swash plate 32 and the pump shoe 33, an annular hydraulic pocket 38 is defined in the front surface of the pump shoe 3 and communicates through oil holes 39, 30, 41 defined in the pump shoe 33, the connecting rods 44, and the pump plungers 6 with pump chambers 45 defined between the pump plungers 6 and the pump cylinder 4. Therefore, oil under pressure in the pump chambers 45 is supplied through the oil holes 41, 40, 39 to the hydraulic pocket 38 for thereby lubricating the sliding surfaces of the pump shoe 33 and the pump swash plate 32. At the same time, oil pressure in the hydraulic pocket 38 is applied to the pump shoe 3 to bear the projecting thrust of the pump plungers 6, so that the pressure of contact between the pump shoe 33 and the pump swash plate 32 can be reduced.

An annular lubricating chamber 43 is defined around the sliding surfaces of the pump swash plate 32 and the pump shoe 33 by means of the motor cylinder 8, the pump swash plate 32, the pump shoe 33, and a roller bearing 42, the lubricating chamber 43 being part of the second chamber 31b.

Oil under pressure in the hydraulic pocket 38 leaks along the sliding surfaces of the pump shoe 33 and the pump swash plate 32 into the lubricating chamber 43 at all times. The oil that has thus leaked first fills the lubricating chamber 43 as lubricating oil, and then leaks into the second chamber 31b through the roller bearing 42. Therefore, the lubricating chamber 43 is always replenished with new lubricating oil which can reliably lubricate the sliding surfaces of the pump shoe 33 and the pump swash plate 32 even from outside of the pump shoe 33, Into the second chamber 31b, there flows oil from the lubricating chamber 43 and also lubricating oil from the sliding surfaces of the pump plungers 6 and the cylinder holes 5 and the sliding surfaces of the pump cylinder 4 and a distribution member 46.

The spring holder 35 has a passage 47 by which the first and second chambers 31a, 31b are held in communication with each other. Between the output shaft 11 and the input shaft 2, there is defined a first discharge passage 48 communicating with the first chamber 31a and coupled through a second discharge passage 49, the pressure control valve 50, and a third discharge passage 51 to the oil tank on the bottom of the transmission case 1.

Figure 4:
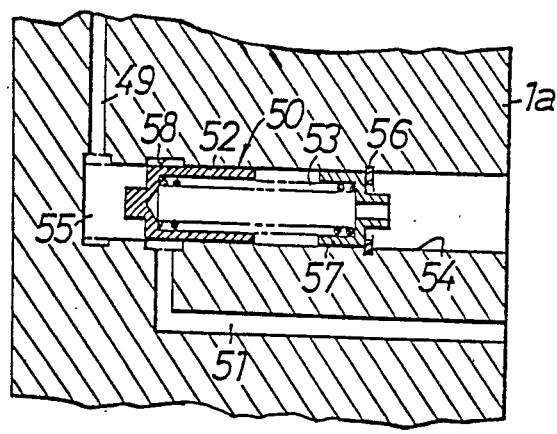
FIG. 4 is an enlarged fragmentary cross-sectional view of an encircled area indicated by IV in FIG. 2.

As shown in FIG. 4, the pressure control valve 50 comprises a bottomed cylindrical spool valve body 52 for allowing and cutting off fluid communication between the second and third discharge passages 49, 51, and a spring 53 for normally urging the spool valve body 52 in a direction to cut off such fluid communication. The end wall of the case member 1a of the transmission case 1 has a bottomed hole 54 parallel to the input shaft 2. The spool valve body 52 is slidably fitted in the bottomed hole 54, defining an oil chamber 55 between the bottom of the hole 54 and the spool valve body 52. A support member 57 is also inserted in the bottomed hole 54, the support member 57 being prevented from moving toward the open end of the bottomed hole 54 by means of a retaining ring 56 fitted in the bottomed hole 54. The spring 53 is disposed between the support member 57 and the spool valve body 52. The spool valve body 52 is therefore caused to slide in the bottom hole 54 until the hydraulic pressure in the oil chamber 55 which tends to open the pressure control valve 50 and the spring force of the spring 53 which tends to close the pressure control valve 50 are counterbalanced.

The oil chamber 55 is held in communication with the second discharge passage 49 which is defined in the end wall of the case member 1a. An annular groove 58 is defined in an inner peripheral surface of the bottomed hole 54 and held in communication with the third discharge passage 51. The annular groove 58 is selectively brought into and out of communication with the oil chamber 55 by the spool valve body 52.

Therefore, when the oil pressure in the oil chamber 55, i.e., the chamber 31, exceeds a level set by the spring 53, the pressure control valve 50 is opened to adjust the oil pressure in the chamber 31 to a prescribed level.

Intermeshing bevel gears 61, 62 are fixed respectively to the confronting ends of the pump cylinder 4 and the pump shoe 33. The bevel gears 61, 62 are synchronous gears having the same number of teeth. When the pump cylinder 4 is rotated by the input shaft 2, the pump shoe 33 is synchronously rotated through the bevel gears 61, 62. On rotation of the pump shoe 33, those pump plungers 6 which run along an ascending side of the inclined surface of the pump swash plate 32 are moved in a discharge stroke by the pump swash plate 32, the pump shoe 33, and the connecting rods 44, and those pump plungers 6 which travel along a descending side of the inclined surface of the pump swash plate 32 are moved in a suction stroke.

Figure 2:
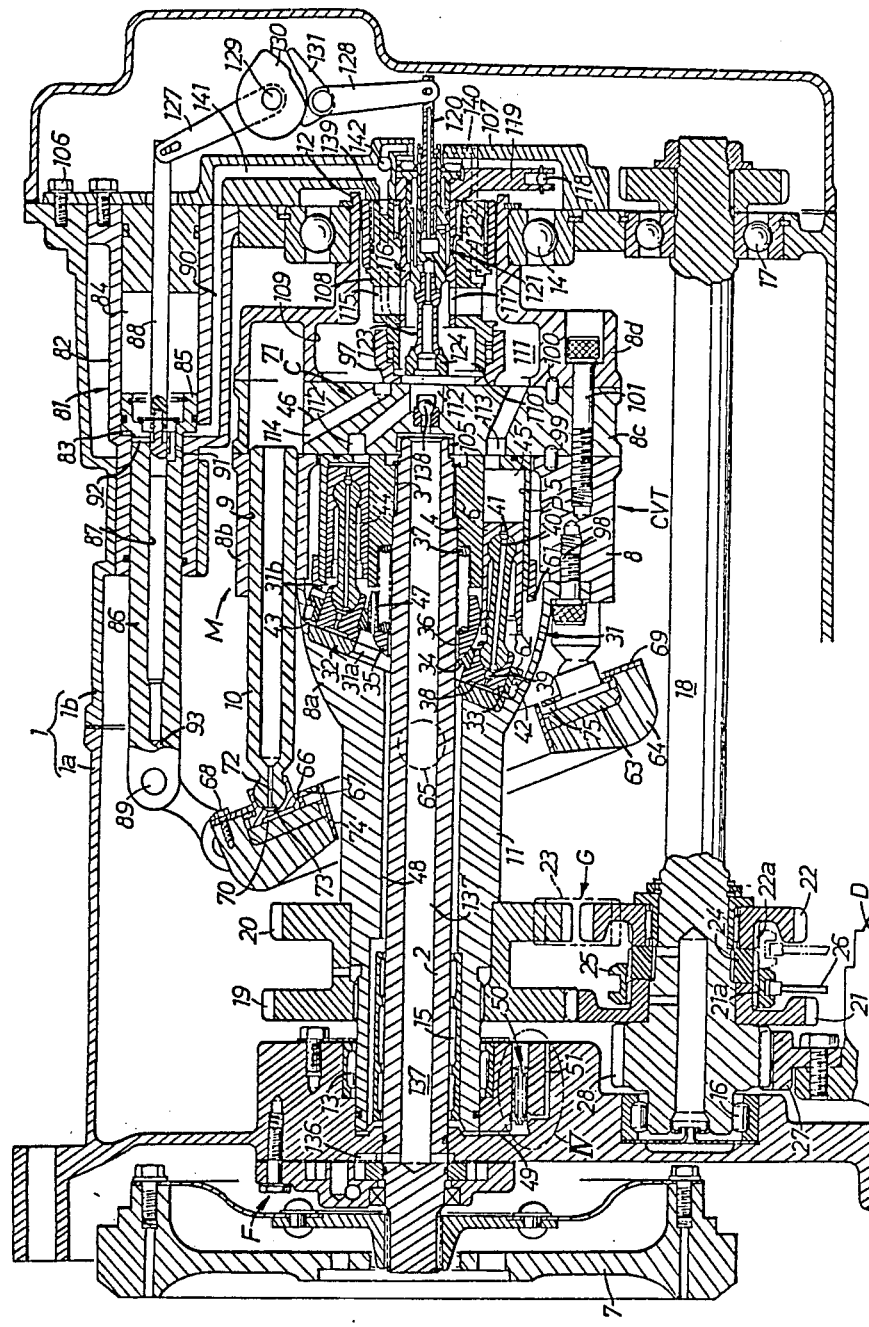
FIG. 2 is a longitudinal cross-sectional view of the hydraulically operated continuously variable transmission.

In the hydraulic motor M, as shown in FIG. 2, an annular motor swash plate 63 confronting the motor cylinder 8 is fitted in an annular swash plate holder 64. The swash plate holder 64 has a pair of integral trunnions 65 projecting outwardly from its opposite sides and pivotally supported in the transmission case 1. Therefore, the motor swash plate 63 can be tilted together with the swash plate holder 64 about the axis of the trunnions 65.

The tip ends of the respective motor plungers 10 are relatively swingably coupled to a plurality of motor shoes 66 held in slidable contact with the motor swash plate 63. To keep the respective motor shoes 66 in slidable contact with the motor swash plate 63, a presser plate 67 which holds the backs of the motor shoes 66 is rotatably supported by a ring 69 fastened to the swash plate holder 64 by means of bolts 68. The motor shoes 66 and the motor plungers 10 where they are coupled project through the presser plate 67 at a plurality of circumferentially spaced positions. The presser plate 67 is therefore rotatable with the motor shoes 66.

Each of the motor shoes 66 has a hydraulic pocket 70 defined in its front face slidably contacting the motor swash plate 63. Oil chambers 71 defined between the closed ends of the cylinder holes 9 and the respective motor plungers 10 communicate with the corresponding hydraulic pockets 70 through joined oil holes 72, 73 defined in the motor plungers 10 and the motor shoes 66. Therefore, oil under pressure in the oil chambers 71 is supplied through the oil holes 72, 73 into the hydraulic pockets 70 to apply a pressure to the motor shoes 66 for bearing the projecting thrust of the motor plungers 10. The pressure thus applied to the motor shoes 66 reduces the pressure of contact between the motor shoes 66 and the motor swash plate 63, and causes oil to lubricate the sliding surfaces of the motor shoes 66 and the motor swash plate 63.

A cylindrical partition 74 is fitted against the inner peripheral surface of the swash plate holder 64 in confronting relation to the inner peripheral surface of the presser plate 67 with a small gap therebetween. The partition 74, the swash plate holder 64, and the presser plate 67 jointly define a lubricating chamber 75 accommodating the sliding surfaces of the motor shoes 66 and the motor swash plate 63.

Oil under pressure in the respective hydraulic pockets 70 leaks along the sliding surfaces of the motor shoes 66 and the motor swash plate 63 at all times. The oil that has thus leaked first fills the lubricating chamber 75 as lubricating oil, and then leaks out through the gap around the presser plate 67. Therefore, the lubricating chamber 75 is always replenished with new lubricating oil which can reliably lubricate the sliding surfaces of the motor shoes 66 and the motor swash plate 63 even from outside of the motor shoes 66.

If the pressure in the lubricating chamber 75 approached the pressure in the hydraulic pockets 70, the ability of the hydraulic pockets 70 to hydraulically support the motor shoes 66 would be impaired. To prevent this, the gap around the presser plate 67 is suitably selected dependent on the amount of oil leakage from the hydraulic pockets 70 so that the lubricating chamber 75 will hold oil under an approximately atmospheric pressure condition.

A servomotor 81 for tilting the swash plate holder 64, i.e., the motor swash plate 63, is disposed in the transmission case 1. The servomotor 81 comprises a servo cylinder 82 fixed to the transmission case 1, a servo piston 85 slidably disposed in the servo cylinder 82 and dividing the interior space of the servo cylinder 82 into a lefthand oil chamber 83 and a righthand oil chamber 84, a piston rod 86 integral with the servo piston 85 and movably extending through the end wall of the servo cylinder 82 near the lefthand oil chamber 83 in a fluid-tight manner, and a pilot valve 88 having an end slidably fitted in a valve hole 87 defined in the servo piston 85 and the piston rod 86 and movably extending through the end of the servo cylinder 82 near the righthand oil chamber 84 in a fluid-tight manner.

The piston rod 86 is coupled to the swash plate holder 64 by a pin 89. An oil passage 90 defined in the servo cylinder 82 is held in communication with the lefthand oil chamber 83 for supplying oil pressure to act on the servo piston 85. The servo piston 85 and the piston rod 86 have a passage 91 for bringing the righthand oil chamber 84 into communication with the valve hole 87 in response to rightward movement of the pilot valve 88, and a passage 92 for bringing the righthand oil chamber 84 into communication with the lefthand oil chamber 83 in response to leftward movement of the pilot valve 88. The valve hole 87 communicates with the oil tank T at the bottom of the transmission case 1 through a return passage 93.

The servo piston 85 is operated in amplified movement by following the lefthand and righthand movement of the pilot valve 88 under the oil pressure from the oil passage 90. In response to movement of the servo piston 85, the swash plate holder 64, i.e., the motor swash plate 63 can be angularly shifted or adjusted between the most inclined position (as shown) and the right-angle position where the motor swash plate 63 lies perpendicularly to the motor plungers 10. Upon rotation of the motor cylinder 8, the motor swash plate 63 reciprocally moves the motor plungers 10 into and out of the cylinder holes 9. The stroke of the motor plungers 10 can continuously be adjusted by the inclination of the motor swash plate 63.

The closed hydraulic circuit C is formed between the hyraulic pump P and the hydraulic motor M through the distribution member 46 and a distribution ring 97. When the pump cylinder 4 is rotated by the input shaft 2, the high-pressure working oil discharged from the pump chambers 45 by the pump plungers 6 in the discharge stroke flows into the oil chambers 71 of the cylinder holes 9 containing the motor plungers 10 which are in the expansion stroke. Working oil discharged from the oil chambers 71 by the motor plungers 10 in the compression stroke flows back into the pump chambers 45 containing the pump plungers 6 in the suction stroke. During this time, the motor cylinder 8, i.e., the output shaft 11, is rotated by the sum of the reactive torque applied by the pump plungers 6 in the discharge stroke to the motor cylinder 8 through the pump swash plate 32 and the reactive torque received by the motor plungers 10 in the expansion stroke from the motor swash plate 63.

The transmission ratio of the motor cylinder 8 to the pump cylinder 4 is given by the following equation:

$$\text{Transmission ratio} = \frac{\text{Rotational speed of pump cylinder 4}}{\text{Rotational speed of motor cylinder 8}}$$
$$= 1 + \frac{\text{Displacement of hydraulic motor } M}{\text{Displacement of hydraulic pump } P}$$

It can be understood from the above equation that the transmission ratio can be varied from 1 to a desired value by varying the displacement of the hydraulic motor M that is determined by the stroke of the motor plungers 10, from zero to a certain value.

The motor cylinder 8 comprises axially separate first through fourth members or segments 8a through 8d. The first member 8a includes the output shaft 11 as a unitary element, and accommodates the pump swash plate 32 therein. The cylinder holes 9 are defined in the second, third, and fourth members 8b through 8d. The third member 8c serves as the distribution member 46. The fourth member 8d has the support shaft 12 as a unitary element.

The first and second members 8a, 8b are coupled to each other by means of a plurality of bolts 98. The second, third, and fourth members 8b, 8c, 8d are relatively positioned by knock pins 99, 100 fitted in positioning holes defined in their mating end faces, and are firmly coupled together by means of a plurality of bolts 101.

The input shaft 2 has an inner end portion rotatably supported centrally in the distribution member 46 by a needle bearing 105. The pump cylinder 4 is resiliently held against the distribution member 46 by the spring 37.

A support plate 107 is fixed to an outer end surface of the case member 1b by means of bolts 106. To the support plate 107, there is securely coupled a cylindrical fixed shaft 108 projecting into the support shaft 12 of the motor cylinder 8. The distribution ring 97 slidably held against the distribution member 46 is eccentrically supported on the inner end of the fixed shaft 108. The distribution ring 97 divides an interior space 109 in the fourth member 8d of the motor cylinder 8 into an inner chamber 110 and an outer chamber 111. The distribution member 46 has an outlet port 112 and an inlet port 113. The outlet port 112 provides fluid communication between the pump chambers 45 that contain the pump plungers 6 operating in the discharge stroke and the inner chamber 110. The inlet port 113 provides fluid communication between the pump chambers 45 that contain the pump plungers 6 operating in the suction stroke and the outer chamber 111. The distribution member 46 also has a number of communication ports 114 defined therein and through which the oil chambers 71 of the motor cylinder 8 communicate with the inner chamber 110 or the outer chamber 111.

Therefore, upon rotation of the pump cylinder 4, high-pressure working oil discharged by the pump plungers 6 in the discharge stroke flows from the outlet port 112 via the inner chamber 110, and those communication ports 114 which communicate with the inner chamber 110 into the oil chambers 71 containing the motor plungers 10 which are in the expansion stroke, thereby imposing a thrust on these motor plungers 10. Working oil discharged by the motor plungers 10 operating in the compression stroke flows through those communication ports 114 which communicate with the outer chamber 111 and the inlet port 113 into the pump chambers 45 containing the pump plungers 6 in the suction stroke. Upon such circulation of the working oil, hydraulic power can be transmitted from the hydraulic pump P to the hydraulic motor M as described above.

The fixed shaft 108 has a peripheral wall having two, for example, radial bypass ports 115 through which the inner and outer chambers 110, 111 communicate with each other. The clutch valve 116 in the form of a cylindrical clutch valve is rotatably fitted in the fixed shaft 108 for selectively opening and closing the ports 115. The clutch valve 116 has valve holes 117 defined in its peripheral wall near the distal end thereof, and a control connector 119 on the opposite end to which a control shaft 118 coupled to a clutch control device (not shown) is connected. The clutch valve 116 serves as a clutch for selectively connecting and disconnecting the hydraulic pump P and the hydraulic motor M.

When the clutch valve 116 is rotated about its own axis to fully open the valve holes 117 in full registry with the bypass ports 115, the clutch is in an "OFF" position. When the bypass ports 115 are fully closed by shifting the valve holes 117 out of registry therewith, the clutch is in an "ON" position. When the bypass ports 115 are partly opened by slightly shifting the valve holes 117, the clutch is in a "partly ON" (partly engaged) position. With the clutch OFF as shown, working oil discharged from the outlet port 112 into the inner chamber 110 flows through the bypass ports 115 and the outer chamber 111 directly into the inlet port 113, making the hydraulic motor M inoperative. When the clutch is ON, the above oil flow is shut off, and working oil is circulated from the hydraulic pump P to the hydraulic motor M, allowing hydraulic power to be transmitted from the hydraulic pump P to the hydraulic motor M.

The clutch valve 116 houses therein a hydraulic servomotor 121 actuatable by a pilot valve 120. The servomotor 121 has a servo piston 122 including a valve rod 123 which is of a diameter smaller than the inside diameter of the clutch valve 116. The valve rod 123 projects into the inner chamber 110 and has a distal end on which a closure valve 124 is pivotally mounted for closing the outlet port 112. When the servo piston 122 is moved to the left until the closure valve 124 is held closely against the distribution member 46, the outlet port 112 is closed. The outlet port 112 is closed when the motor swash plate 73 is vertically positioned (as viewed in FIG. 2) for the transmission ratio of 1. With the outlet port 112 closed, the pump plungers 6 are hydraulically locked to cause the pump cylinder 4 to mechanically drive the motor cylinder 8 through the pump plungers 6 and the pump swash plate 32. As a result, the thrust of the motor plungers 10 on the motor swash plate 63 is eliminated, and so is the load on the various bearings.

The fixed shaft 108 and the support plate 107 have an oil passage 139 communicating with the inner chamber 110 and an oil passage 140 communicating with the outer chamber 111. The support plate 107 has an oil passage 141 communicating with the oil passage 90 connected to the servomotor 81. A changeover valve 142 is disposed in the support plate 107 for selectively communicating the oil passages 139, 140 with the oil passage 141. The changeover valve 142 operates to communicate one of the oil passages 139, 140 which is of a higher oil pressure, with the oil passage 141. Therefore, the servomotor 81 for tilting the motor swash plate 63 of the hydraulic motor M is supplied with the higher oil pressure from the inner chamber 110 or the outer chamber 111.

The pilot valves 88, 120 of the respective servomotors 81, 121 are coupled to ends of links 127, 128, respectively. The other end of the link 127 is coupled to a rotatable shaft 129 which can be rotated about its own axis by an actuator (not shown), the shaft 129 having a cam 130 supported thereon. The other end of the link 128 supports thereon a cam follower 131 slidingly contacting the cam 130. When the servomotor 81 is operated to vertically position the motor swash plate 63, the servomotor 121 is operated by the link 127, the cam 130, the cam follower 131, and the link 128 to enable the closure valve 124 to close the outlet port 112.

The replenishing pump F is mounted on an outer surface of the end wall of the case member 1a. The replenishing pump F is driven by the input shaft 2 for feeding working oil from the oil tank T on the bottom of the transmission case 1. The replenishing pump F has an outlet port 136 communicating through an axial central oil passage 137 defined in the input shaft 2 with the inner chamber 110 via a check valve 138 and also with the outer chamber 111 via another check valve (not shown). The replenishing pump F therefore supplies oil to automatically compensating for any oil leakage from the closed hydraulic circuit C composed of the hydraulic pump P and the hyraulic motor M.

Figure 5:
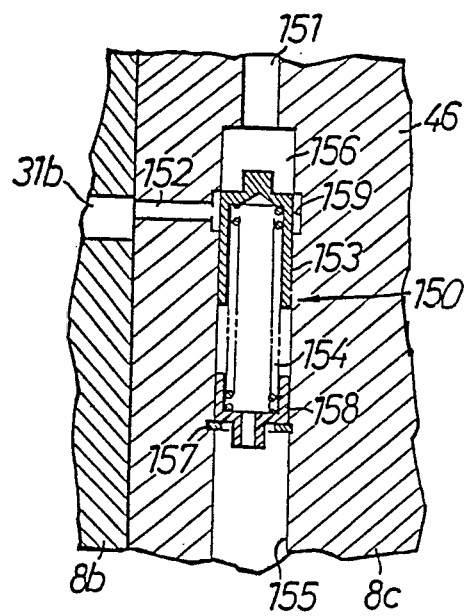
FIG. 5 is an enlarged fragmentary cross-sectional view of an encircled area indicated by V in FIG. 2.

As shown in FIG. 5, the distribution member 46 has an oil passage 151 communicating with the replenishing oil passage 137 and an oil passage 152 communicating with the second chamber 31b of the chamber 31, with the relief valve 150 being disposed in the distribution member 46 between the oil passages 151, 152.

The pressure control valve 150 comprises a bottomed cylindrical spool valve body 153 for allowing and cutting off fluid communication between the oil passages 151, 152, and a spring 154 for normally urging the spool valve body 153 in a direction to cut off such fluid communication. The distribution member 46 has a bottomed hole 155 defined therein and opening at an outer side surface thereof. The spool valve body 153 is slidably fitted in the bottomed hole 155, defining an oil chamber 156 between the bottom of the hole 151 and the spool valve body 153. A support member 158 is also inserted in the bottomed hole 155, the support member 158 being prevented from moving toward the open end of the bottomed hole 155 by means of a retaining ring 157 fitted in the bottomed hole 155. The spring 154 is disposed between the support member 158 and the spool valve body 153. The spool valve body 153 is therefore caused to slide in the bottom hole 155 until the hydraulic pressure in the oil chamber 156 which tends to open the relief valve 150 and the spring force of the spring 154 which tends to close the relief valve 150 are counterbalanced.

The oil chamber 156 is held in communication with the oil passage 151. An annular groove 159 is defined in an inner peripheral surface of the bottomed hole 155 and located communication with the oil passage 152. The annular groove 159 is selectively brought into and out of communication with the oil chamber 156 by the spool valve body 153.

Therefore, when the oil pressure in the oil chamber 156, i.e., the replenishing oil passage 137, exceeds a level set by the spring 154, the relief valve 150 is opened to introduce oil released from the replenishing oil passage 137 into the chamber 31 via the oil passage 152. The pressure level set for opening the pressure control valve 50 is lower than the pressure level set for opening the relief valve 150.

Operation of the hydraulically operated continuously variable transmission thus constructed is as follows:

The second chamber 31b of the chamber 31 defined between the pump cylinder 4 and the motor cylinder 8 is supplied with most of the oil that has leaked from between the sliding surfaces of the shoe 33 and the swash plate 32, oil that has leaked from between the sliding surfaces of the pump cylinder 4 and the distribution member 46, and oil that has leaked from between the sliding surfaces of the plungers 6 and the cylinder holes 5. When the relief valve 150 is opened, working oil that has been released from the replenishing oil passage 137 is also introduced into the second chamber 31b. The first chamber 31a communicating with the second chamber 31b through the passage 47 is supplied with the remainder of the oil that has leaked from between the sliding surfaces of the shoe 33 and the swash plate 32. The leaked oil sealed in the chamber 31 is discharged via the discharge passages 48, 49, 51 when the pressure control valve 50 is opened.

Now, when the hydraulic pump P rotates at high speed or under high load, the amount of oil leaked from various parts is increased. Upon increase in the amount of leaked oil, the oil pressure in the chamber 31 is also increased. When the pressure in the chamber 31 exceeds the pressure level for the pressure control valve 50, the pressure control valve 50 is opened to discharge the oil from the chamber 31. Since the pressure level for the pressure control valve 50 is lower than the pressure level for the relief valve 150, the oil pressure in the chamber 31 will not become higher than the pressure level for the relief valve 150. Therefore, the relief valve 150 remains normal in its operation, thereby preventing the pressure of oil discharged from the replenishing pump F from being unduly increased.

Figure 6:
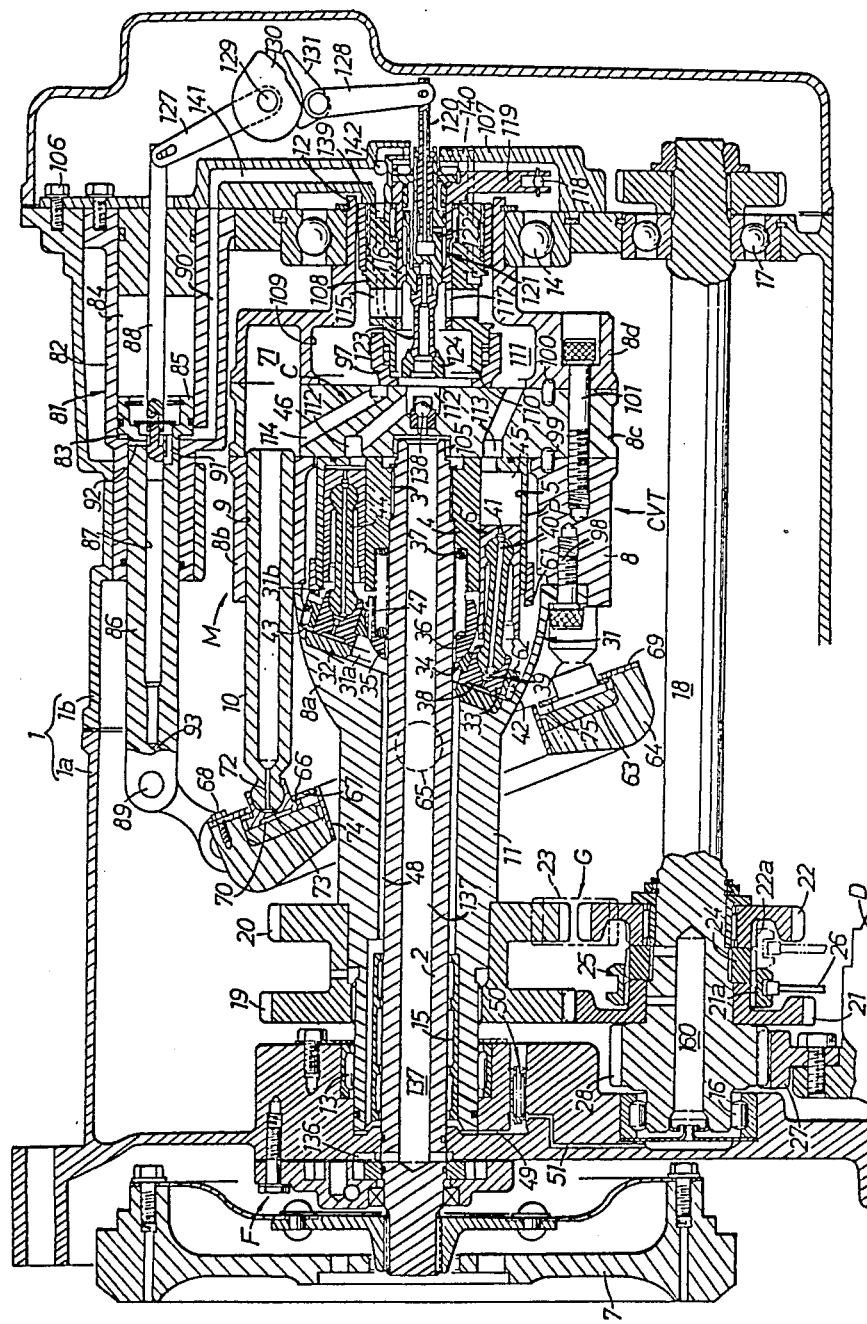
FIG. 6 is a longitudinal cross-sectional view of an automotive hydraulically operated continuously variable transmission according to another embodiment of the present invention.

FIG. 6 shows a hydraulically operated continuously variable transmission according to another embodiment of the present invention. This embodiment differs from the preceding embodiment only in that the third discharge passage 51 connected to the pressure control valve 50 is defined in the case member 1a of the transmission case 1 such that the third discharge passage 51 communicates with an oil reservoir 160 defined in an end of the auxiliary shaft 18. The roller bearing 16 and the gear assembly G can therefore be effectively lubricated with oil from the oil reservoir 160.

With the arrangements shown in FIGS. 2 and 6, the pressure control valve 50 which is opened by the oil pressure in the chamber 31 that is lower than the pressure level for open the relief valve 150 is disposed between the discharge passages 49, 51 for preventing the oil pressure in the chamber 31 from exceeding the pressure level for opening the relief valve 150. The relief valve 150 is accordingly allowed to operate normally at all times.

Figure 7:
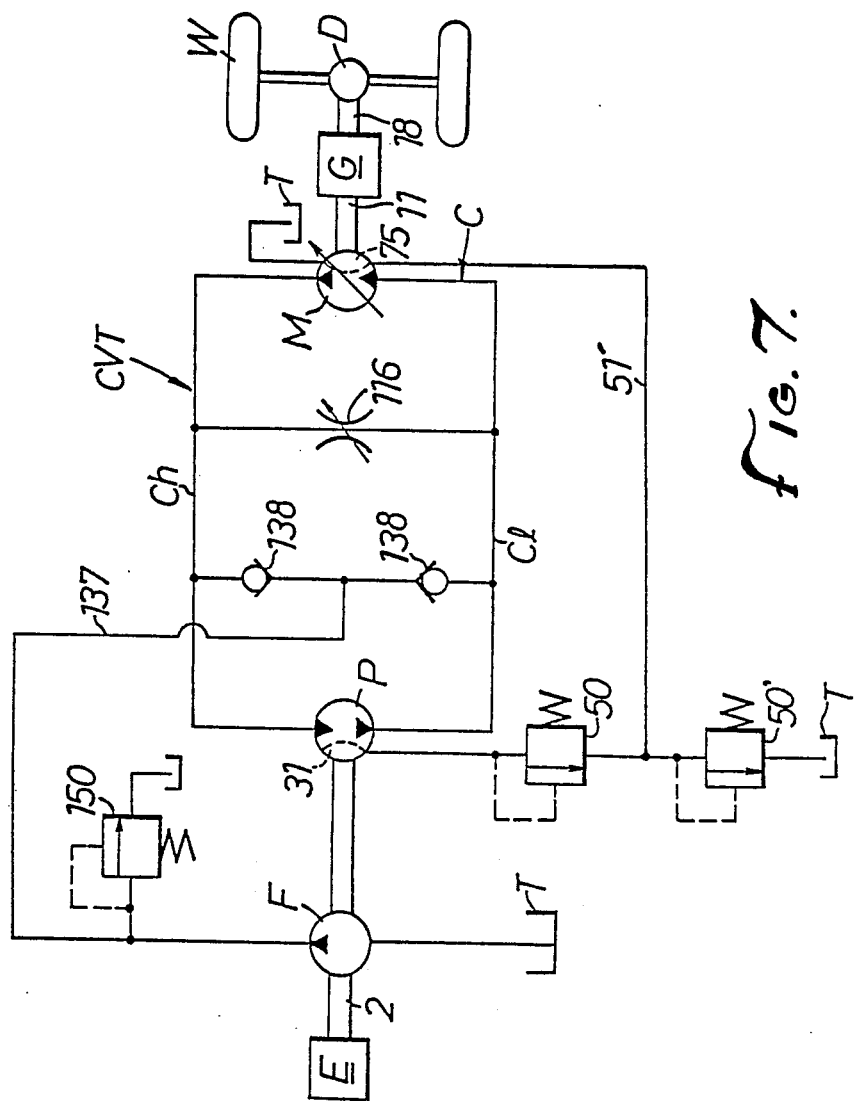
FIG. 7 is a circuit diagram of a hydraulic circuit arrangement of a hydraulically operated continuously variable transmission according to still another embodiment of the present invention.

FIGS. 7 through 11 illustrate a hydraulically operated continuously variable transmission according to still another embodiment of the present invention. FIG. 7 shows a hydraulic circuit arrangement of the transmission, which is different from that shown in FIG. 1 in that the relief valve 150 is directly connected to the oil tank T, the chamber 31 is connected to the lubricating chamber 75 of the hydraulic motor M through a first pressure control valve 50, and a second pressure control valve 50' is coupled to a junction between the first pressure control valve 50 and the lubricating chamber 75. The second pressure control valve 50' is openable at a pressure level which is lower than the pressure level set for opening the first pressure control valve 50.

Figure 8:
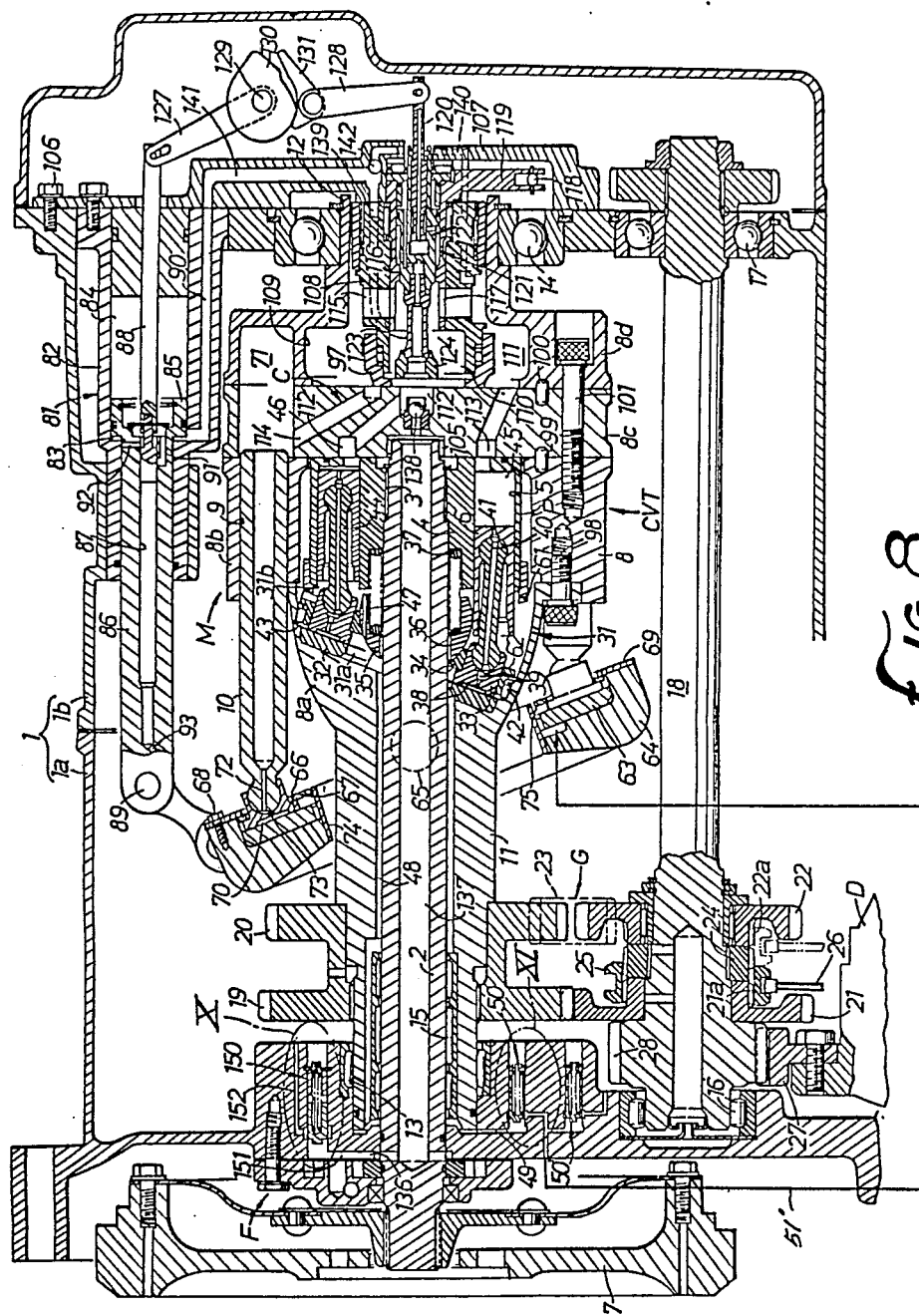
FIG. 8 is a longitudinal cross-sectional view of the hydraulically operated continuously variable transmission of FIG. 7.
Figure 9:
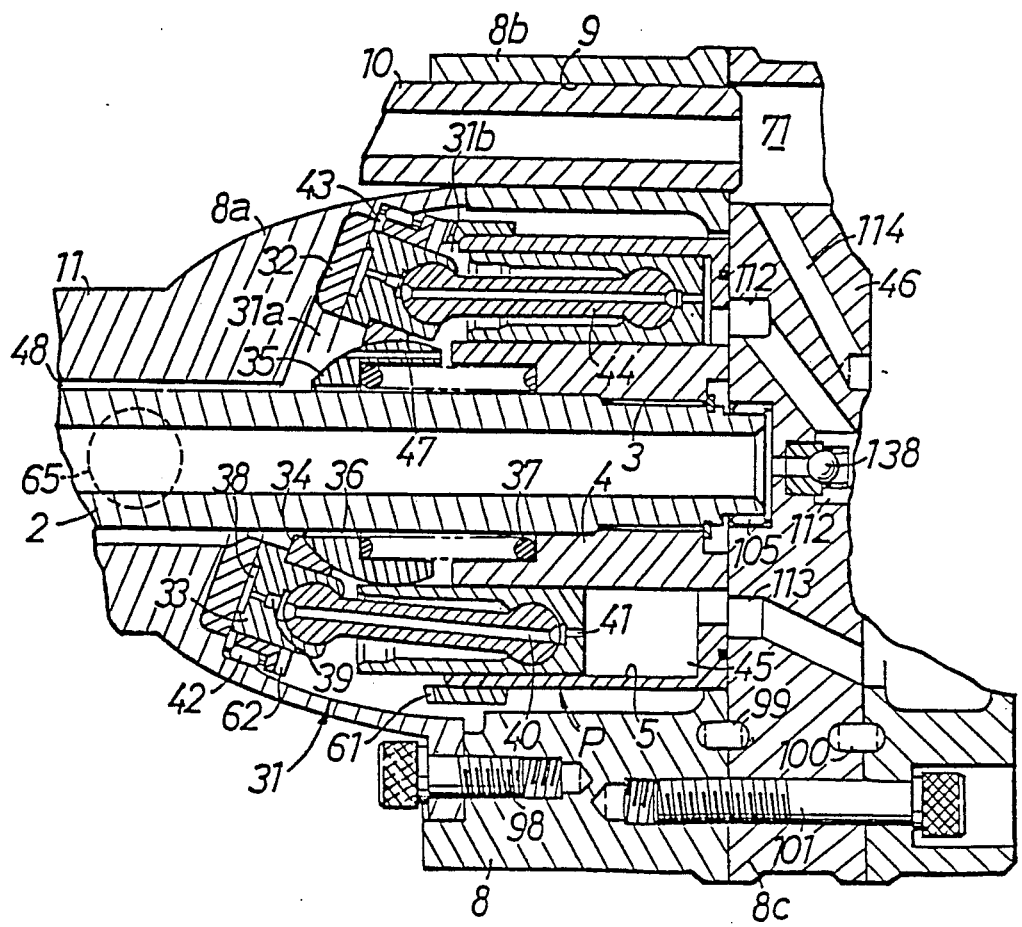
FIG. 9 is an enlarged fragmentary cross-sectional of a portion view of the hydraulically operated continuously variable transmission shown in FIG. 8.
Figure 10:
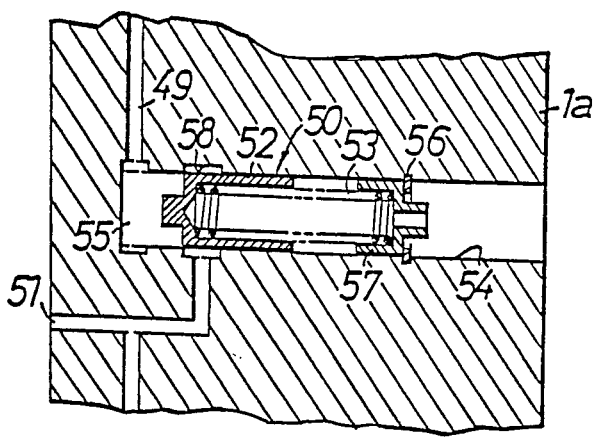
FIG. 10 is an enlarged fragmentary cross-sectional view of an encircled area indicated by X in FIG. 8.

As shown in FIG. 10, the first pressure control valve 50 is disposed in the case member 1a and is identical in construction to the pressure control valve shown in FIG. 4. As illustrated in FIGS. 8 and 10, the first pressure control valve 50 is connected to the lubricating chamber 75 through an oil passage 51'.

The second pressure control valve 50' is also disposed in the case member 1a and is identical in construction to the first pressure control valve 50. The second pressure control valve 50' is connected to a junction between the first pressure control valve 50 and the oil passage 51a and also to the oil tank T, as illustrated in FIG. 7.

Figure 11:
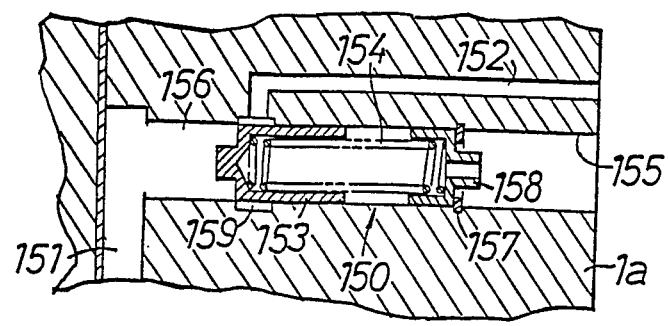
FIG. 11 is an enlarged fragmentary cross-sectional view of an encircled area indicated by XI in FIG. 8.

As shown in FIG. 11, the relief valve 150 which is substantially identical in construction to the relief valve 150 shown in FIG. 5 is disposed in the case member 1a and positioned between oil passages 151, 152 defined in the case member 1a. The oil passage 151 communicates with the outlet port 136 of the replenishing pump F, and the oil passage 152 has one end that opens at a side surface of the case member 1a. The relief valve 150 is slidably disposed in a hole 155 defined in the case member 1a and having one end opening at the side surface thereof. When the oil pressure in the outlet port 136 of the replenishing pump F exceeds a prescribed pressure level higher than the spring force of the spring 154, the relief valve 150 is opened to release the oil pressure into the oil tank T for thereby maintaining the oil pressure discharged from the replenishing pump F at a constant level.

When the oil pressure in the lubricating chamber 75 of the hydraulic motor M, i.e., in the oil passage 51' exceeds the pressure level for opening the second pressure control valve 50', the second pressure control valve 50' is opened to discharge the oil from the oil passage 51' into the oil tank T. Since the pressure level set for opening the second pressure control valve 50' is lower than the pressure level set for opening the first pressure control valve 50, the oil pressure in the lubricating chamber 75 is prevented from exceeding the pressure level set for opening the first pressure control valve 50. Therefore, the first pressure control valve 50 is allowed to operate normally at all times, so that oil from the chamber 31 can smoothly be circulated.

The relief valve 150 and the first and second pressure control valves 50, 50' are shown as being disposed in the end wall of the case member 1a in FIG. 8. However, the relief valve 150 and the first and second pressure control valves 50, 50' may be provided separately from the case member 1a and may be attached to the case member 1a.

Figure 12:
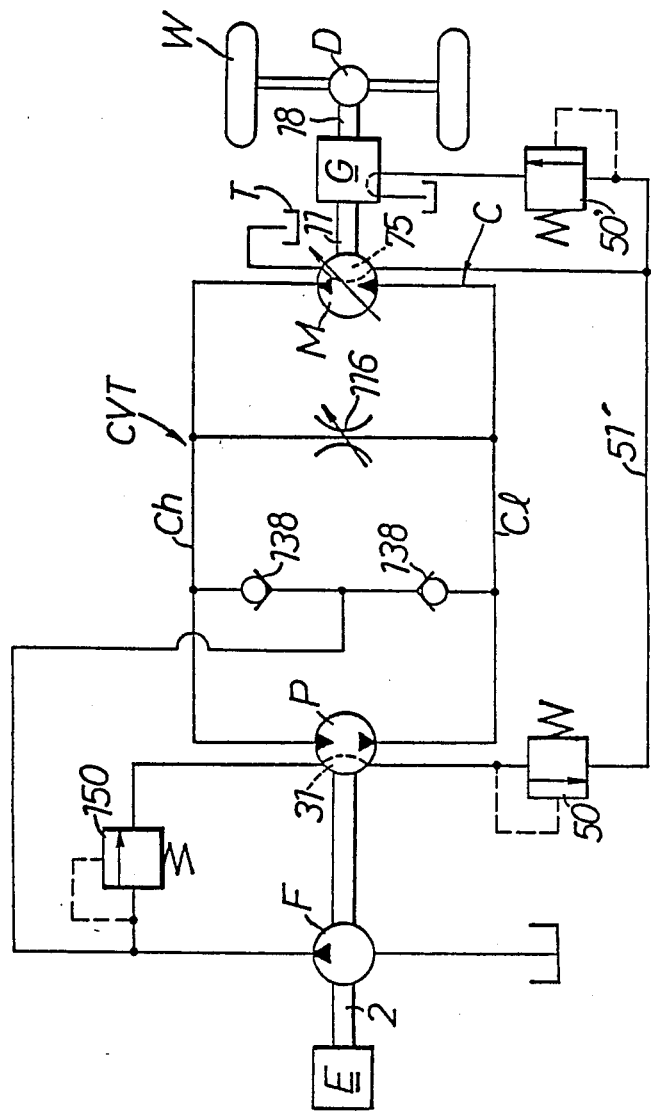
FIG. 12 is a circuit diagram of a hydraulic circuit arrangement of a hydraulically operated continuously variable transmission according to a further embodiment of the present invention.
Figure 13:
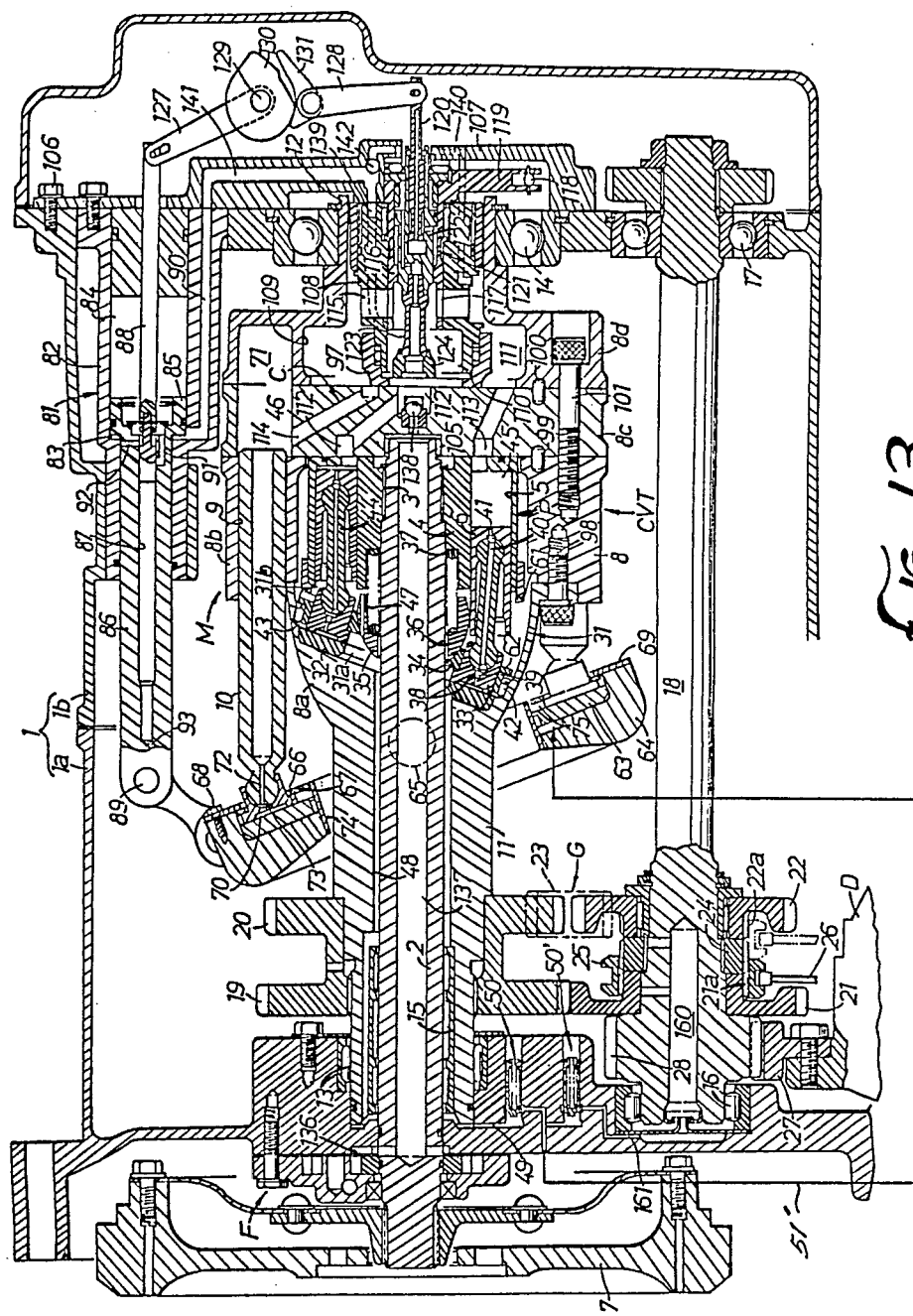
FIG. 13 is a longitudinal cross-sectional view of the hydraulically operated continuously variable transmission of FIG. 12.

FIGS. 12 and 13 show a hydraulically operated continuously variable transmission according to a further embodiment of the present invention. In this embodiment, the relief valve 150 is connected to the chamber 31, the first pressure control valve 50 coupled to the chamber 31 is connected through the oil passage 51' to the lubricating chamber 75, and the second pressure control valve 50' is connected through an oil passage 161 to the oil reservoir 160 in the auxiliary shaft 18. The relief valve 150 is disposed in the distribution member 46 in the same manner as shown in FIGS. 3 and 5.

The pressure level set for opening the first pressure control valve 50 is lower than the pressure level set for opening the relief valve 150. Therefore, the oil pressure in the chamber 31 remains lower than the pressure level for the relief valve 150, which is thus permitted to operate normally at all times.

In the embodiments of FIGS. 7 and 12, the first pressure control valve 50 which is openable when the oil pressure in the chamber 31 exceeds a prescribed pressure level is connected between the chamber 31 and the oil passage 51' leading to the lubricating chamber 75, and the second pressure control valve 50' which is openable at a prescribed pressure level lower than the pressure level for opening the first pressure control valve 50 is connected to the oil passage 51'. Therefore, even when the oil pressure in the lubricating chamber 75 is increased, the oil pressure in the oil passage 51' is released by the second pressure control valve 50' to allow the first pressure control valve 50 to operate normally. Therefore, oil in the chamber 31 is circulated smoothly without being subjected to an excessive temperature rise, and hence the durability of the hydraulic pump P or the hydraulic motor M is not lowered.

Although certain preferred embodiments have been shown and described, it should be understood that many changes and modifications may be made therein without departing from the scope of the appended claims.

What is claimed is:

1. A hydraulically operated continuously variable transmission comprising:
an input shaft;
a hydraulic pump coupled to said input shaft and having a pump swash plate and a pump cylinder supporting an annular array of slidable pump plungers held in slidable contact with said pump swash plate through mutually sliding surfaces;
an output shaft;
a hydraulic motor coupled to said output shaft and having a motor swash plate and a motor cylinder supporting an annular array of slidable motor plungers held in slidable contact with said motor swash plate through mutually sliding surfaces;
a closed hydraulic circuit interconnecting said hydraulic pump and said hydraulic motor;
a hydraulically hermetic chamber surrounding at least one of said hydraulic motor and said hydraulic pump, said hydraulically hermetic chamber communicating with the sliding surfaces of said at least one of said hydraulic motor and said hydraulic pump;
a replenishing pump operatively coupled to said input shaft and connected to said closed hydraulic circuit through a replenishing oil passage;
a relief valve through which said hydraulically hermetic chamber is connected to said replenishing oil passage, said relief valve being openable when the oil pressure in said replenishing oil passage exceeds a first pressure level; and
a pressure control valve disposed in a discharge passageway of said hydraulically hermetic chamber and openable when the oil pressure in said hydraulically hermetic chamber exceeds a second pressure level which is lower than said first pressure level.

2. A hydraulically operated continuously variable transmission comprising:
an input shaft;
a hydraulic pump coupled to said input shaft and having a pump wash and a pump cylinder supporting an annular array of slidable pump plungers held in slidable contact with said pump swash plate through mutually sliding surfaces;
an output shaft;
a hydraulic motor coupled to said output shaft and having a motor swash plate and a motor cylinder supporting an annular array of slidable motor plungers held in slidable contact with said motor swash plate through mutually sliding surfaces;
a closed hydraulic circuit interconnecting said hydraulic pump and said hydraulic motor;
a hydraulically hermetic chamber surrounding at least one of said hydraulic motor and said hydraulic pump, said hydraulically hermetic chamber communicating with the sliding surfaces of said at least one of said hydraulic motor and said hydraulic pump;
a replenishing pump operatively coupled to said input shaft and connected to said closed hydraulic circuit through a replenishing oil passage;
a relief valve through which said hydraulically hermetic chamber is connected to said replenishing oil passage, said relief valve being openable when the oil pressure in said replenishing oil passage exceeds a first pressure level;
a pressure control valve disposed in a discharge passageway of said hydraulically hermetic chamber and openable when the oil pressure in said hydraulically hermetic chamber exceeds a second pressure level which is lower than said first pressure level; and
a forward/reverse gear assembly operatively coupled to said output shaft, said discharge passageway being connected to an oil reservoir for lubricating said forward/reverse gear assembly.

3. A hydraulically operated continuously variable transmission comprising:
an input shaft;
a hydraulic pump coupled to said input shaft and having a pump swash plate and a pump cylinder supporting an annular array of slidable pump plungers held in slidable contact with said pump swash plate through mutually sliding surfaces which are supplied with oil from said pump cylinder for lubrication thereof;
an output shaft;
a hydraulic motor coupled to said output shaft and having a motor swash plate and a motor cylinder supporting an annular array of slidable motor plungers held in slidable contact with said motor swash plate through mutually sliding surfaces which are supplied with oil from said pump cylinder for lubrication thereof;
a closed hydraulic circuit interconnecting said hydraulic pump and said hydraulic motor;
a lubricating chamber surrounding the sliding surfaces of the swash plate and the plungers of at least one of said hydraulic pump and said hydraulic motor;
a hydraulically hermetic chamber surrounding the other of said hydraulic motor and said hydraulic pump, said hydraulically hermetic chamber communicating with the sliding surfaces of said other of said hydraulic motor and said hydraulic pump;
a first pressure control valve connected between said hydraulically hermetic chamber and an oil passage leading to said lubricating chamber and openable when the oil pressure in said hydraulically hermetic chamber exceeds a first pressure level; and
a second pressure control valve connected to a junction between said first pressure control valve and said oil passage and openable when the oil pressure in said oil passage exceeds a second pressure level lower than said first pressure level.

4. A hydraulically operated continuously variable transmission according to claim 3, further including a replenishing pump operatively coupled to said input shaft and connected to said closed hydraulic circuit through a replenishing oil passage, and a relief valve through which said hydraulically hermetic chamber is connected to said replenishing oil passage, said relief valve being openable when the oil pressure in said replenishing oil passage exceeds a third pressure level higher than said first pressure level.

5. A hydraulically operated continuously variable transmission according to claim 3, further including a forward/reverse gear assembly operatively coupled to said output shaft, said second pressure control valve being connected to an oil reservoir for lubricating said forward/reverse gear assembly.

6. A hydraulically operated continuously variable transmission having a hydraulic pump and hydraulic motor connected by a closed hydraulic circuit, comprising:
- a hydraulically hermetic chamber communicating with at least one of said hydraulic motor and said hydraulic pump;
- a valve communicating with said hydraulically hermetic chamber and being openable when the oil pressure supplied to said hydraulically hermetic chamber exceeds a first pressure level; and
- another valve communicating with said hydraulically hermetic chamber and openable when the oil pressure in said hydraulically hermetic chamber exceeds a second pressure level which is lower than said first pressure level.

7. A hydraulically operated continuously variable transmission having a hydraulic pump and a hydraulic motor connected by a closed hydraulic circuit, comprising:
- a hydraulically hermetic chamber communicating with at least one of said hydraulic motor and said hydraulic pump;
- a valve communicating with said hydraulically hermetic chamber and being openable when the oil pressure supplied to said hydraulically hermetic chamber exceeds a first pressure level; another valve communicating with said hydraulically hermetic chamber and openable when the oil pressure in said hydraulically hermetic chamber exceeds a second pressure level which is lower than said first pressure level; and
- a third valve communicating with the outlet of said another valve, said third valve being openable when the oil pressure on the outlet of said another valve exceeds a third pressure level which is lower than said second pressure level.

* * * * *